US007999722B2

(12) United States Patent
Beeri et al.

(10) Patent No.: US 7,999,722 B2
(45) Date of Patent: Aug. 16, 2011

(54) THROUGH-WALL IMAGING DEVICE

(75) Inventors: Amir Beeri, Zoran (IL); David Gazelle, Kfar-Hess (IL); Mordechay Divald, Even Yehuda (IL)

(73) Assignee: Camero-Tech Ltd., Kfar Neter (IL)

( * ) Notice: Subject to any disclaimer, the term of this patent is extended or adjusted under 35 U.S.C. 154(b) by 43 days.

(21) Appl. No.: 11/991,538

(22) PCT Filed: Jun. 15, 2006

(86) PCT No.: PCT/IL2006/000696
§ 371 (c)(1),
(2), (4) Date: Aug. 12, 2009

(87) PCT Pub. No.: WO2007/029226
PCT Pub. Date: Mar. 15, 2007

(65) Prior Publication Data
US 2009/0295618 A1 Dec. 3, 2009

(30) Foreign Application Priority Data
Sep. 6, 2005 (IL) ............................ 170689

(51) Int. Cl.
*G01S 13/89* (2006.01)
*H01Q 1/08* (2006.01)
(52) U.S. Cl. ........................... 342/22; 342/27
(58) Field of Classification Search ............... 342/22, 342/27, 28
See application file for complete search history.

(56) References Cited

U.S. PATENT DOCUMENTS

| 5,446,461 | A  | * | 8/1995  | Frazier .......................... 342/22 |
| 5,680,048 | A  |   | 10/1997 | Wollny |
| 6,762,709 | B2 | * | 7/2004  | Kikuchi et al. ................. 342/22 |
| 6,970,128 | B1 | * | 11/2005 | Dwelly et al. ............... 342/25 F |
| 7,307,575 | B2 | * | 12/2007 | Zemany ......................... 342/22 |
| 7,355,545 | B2 | * | 4/2008  | Zemany et al. ................ 342/22 |
| 2002/0145570 | A1 |  | 10/2002 | Barnes et al. |
| 2004/0119633 | A1 |  | 6/2004  | Oswald et al. |
| 2006/0061504 | A1 | * | 3/2006 | Leach et al. ................... 342/22 |
| 2006/0170584 | A1 | * | 8/2006 | Romero et al. ................ 342/22 |

FOREIGN PATENT DOCUMENTS
EP 1 168 498 1/2002
(Continued)

OTHER PUBLICATIONS

Nag, S., et al., "An Ultra-Wideband Through-Wall Radar for Detecting the Motion of People in Real Time", *Proceedings of SPIE*, vol. No. 4744, p. 48-57, (2002).

(Continued)

*Primary Examiner* — Ian J Lobo
(74) *Attorney, Agent, or Firm* — The Nath Law Group; Susanne M. Hopkins; William L. Klima

(57) ABSTRACT

A through-wall imaging device having antenna elements for transmitting and receiving signals adapted to pass through a wall for imaging objects therebehind, having a base with a carrier portion and a plurality of spaced-apart extensions connected thereto. At least a portion of the antenna elements are mounted on the extensions. The area between adjacent extensions is free of any material of the base at least when the extensions are in an operative state.

21 Claims, 12 Drawing Sheets

FOREIGN PATENT DOCUMENTS

| | | |
|---|---|---|
| JP | 10051215 | 2/1998 |
| JP | 2002335113 | 11/2002 |
| WO | 2004/015812 | 2/2004 |

OTHER PUBLICATIONS

"A Wideband Imaging Radar for Through-the-Wall Surveillance", *JPIE Defense and Security Symposium*, p. 1-21, (Apr. 15, 2004).

"Handheld Through-Wall Radar Delivers Unique 3D View That Can Revolutionise Security Work", *Cambridge Consultants*, p. 1-2 (Jun. 7, 2005).

Amazeen, C. A., et al., "Developmental Status of the U.S. Army's New Handheld Standoff Mine Detection System (Hstamids)", *U.S. Army Communications and Electronics*, p. 193-197, (1998).

\* cited by examiner

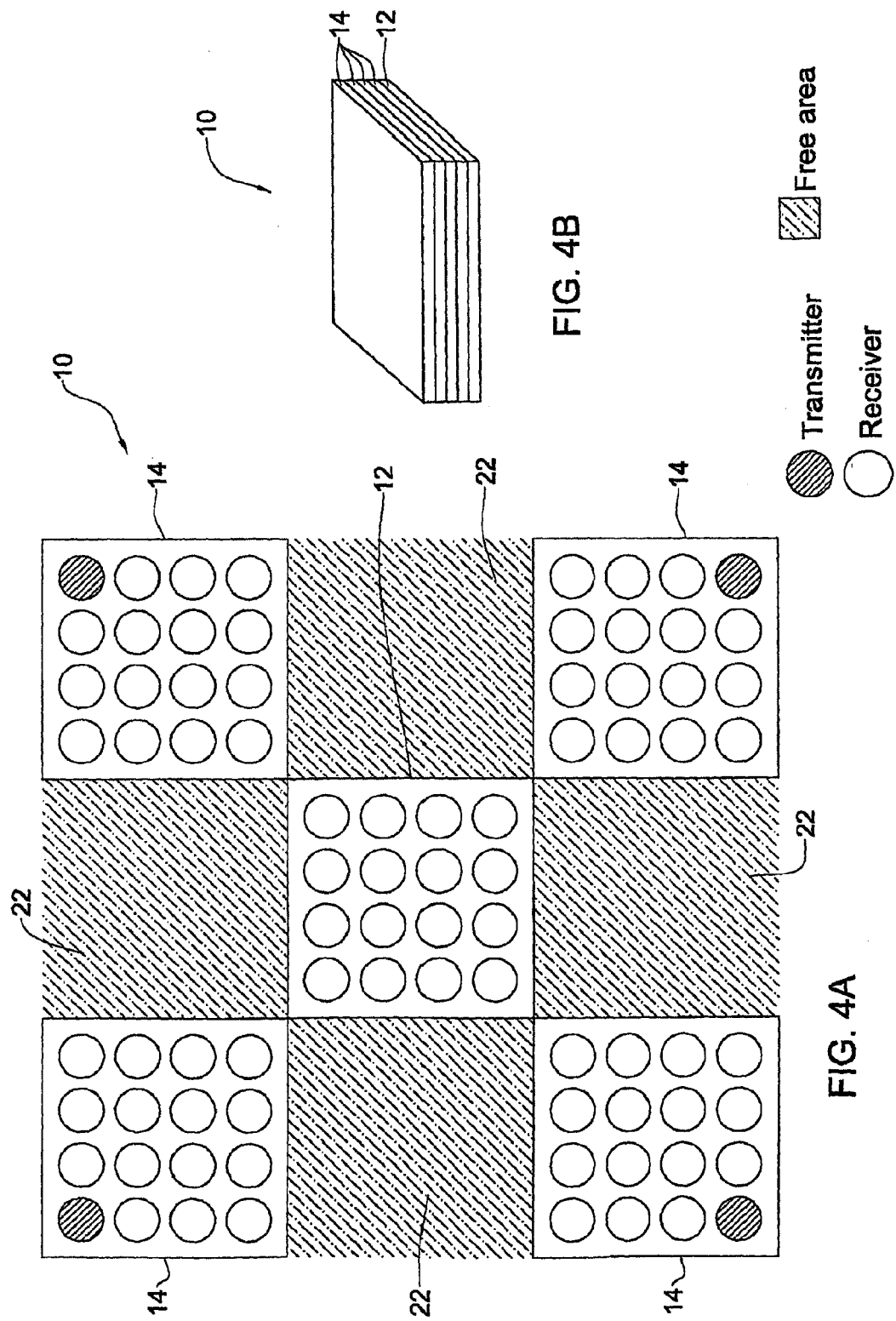

◉ Transmitter ▦ Free area
○ Receiver

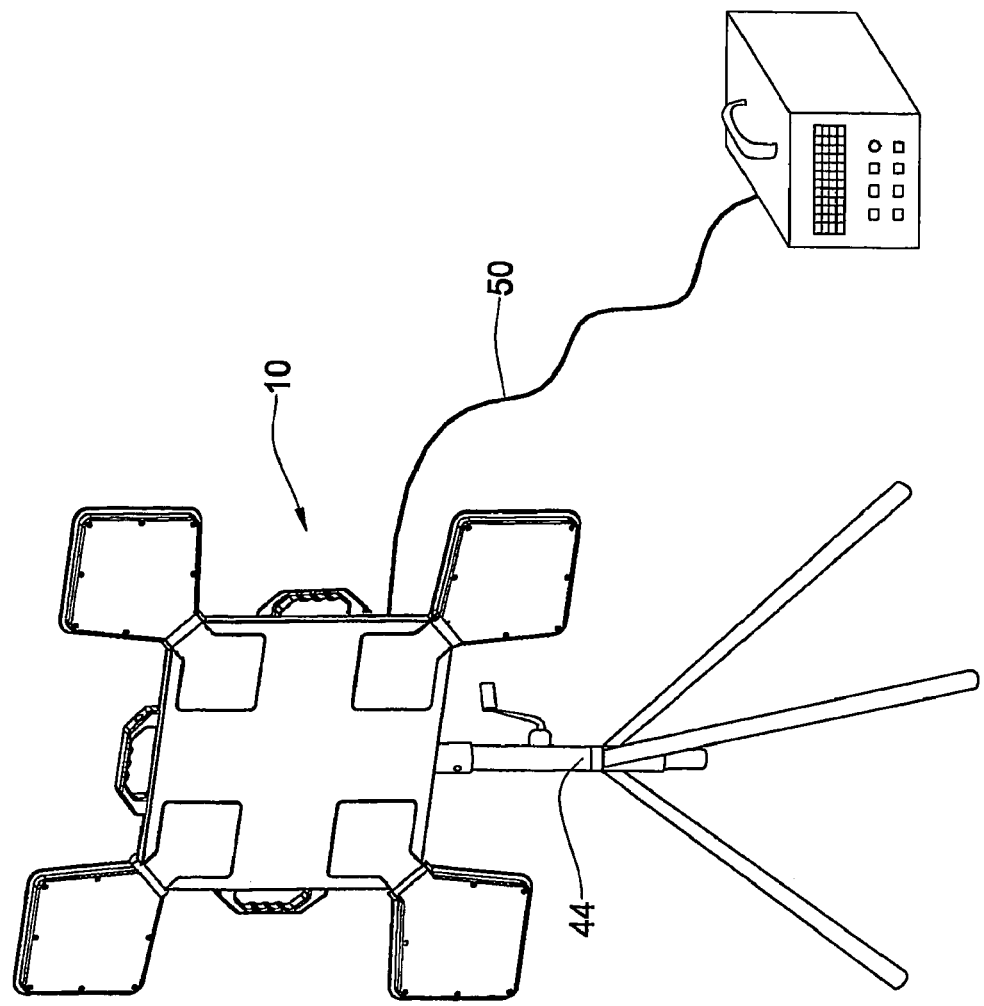

THROUGH-WALL IMAGING DEVICE

FIELD OF THE INVENTION

This invention relates to through-wall imaging devices having antenna elements for transmitting and receiving ultra-wideband signals adapted to pass through a wall, and circuitry for processing images of objects behind the wall based on the signals.

BACKGROUND OF THE INVENTION

Through-wall imaging is a technology which has many applications, especially those in which decisions are made in extreme or life-threatening situations. Often, advance knowledge of objects behind a wall can alter the decision making process in front of the wall for the better. For example, in lifesaving applications, such as fire rescue situations, pinpointing occupants in a burning building allows rescue personnel to reach them quicker, while avoiding going into other rooms unnecessarily. In law enforcement situations, situational awareness regarding objects behind a wall can favorably influence operational strategy. For example, knowledge of the number and location of suspects or hostages within a room can lead to fewer unwanted casualties in a raid. Such devices may be used for similar purposes by special operation forces or the like.

Through-wall imaging devices presently known typically comprise an array of antenna elements, some being adapted to transmit, and others being adapted to receive ultra-wideband signals. These devices also comprise a processor to interpret the received signals, and a display unit. They may also be designed so as to facilitate their carrying during imaging.

SUMMARY OF THE INVENTION

The present invention is directed to a device adapted for through-wall imaging which is compact, readily transportable, and easily held during use.

According to one aspect of the present invention, there is provided a through-wall imaging device having antenna elements for transmitting and receiving signals, which may be ultra-wideband signals, adapted to pass through a wall for imaging objects behind the wall. The device comprises a base having a carrier portion and a plurality of spaced-apart extensions connected thereto. At least a portion of the antenna elements are mounted on the extensions. The area between adjacent extensions, which is different from the carrier portion, is free of any material of the base at least when the extensions are in an operative state. The carrier portion may be any part of the base which carries the extensions, such as a plate, a hinge, or portions of the extensions themselves.

According to one embodiment, the extensions are moveable with respect to the carrier portion between a first position and a second position. The first and second positions may correspond to different operative states, or they may be an operative state and an inoperative state. The extensions may be connected to the carrier portion in a manner permitting folding of the extensions onto the carrier portion, for example, by being hingedly articulated thereto.

According to another aspect of the present invention, there is provided a through-wall imaging device having antenna elements for transmitting and receiving signals, which may be ultra-wideband signals, adapted to pass through a wall for imaging of an object or objects behind the wall. The device comprises a base having a carrier portion and at least one extension connected thereto. Either a physical connection or wireless communication may constitute the connection. At least a portion of the antenna elements is mounted to the at least one extension. The extension is movable with respect to the carrier portion between a first position and a second position. The first and second positions may correspond to different operative states, or they may be an operative state and an inoperative state. The extensions may be connected to the carrier portion in a manner permitting folding of the extensions onto the carrier portion, for example, by being hingedly articulated thereto.

According to either of the above-mentioned aspects, the portion of the antenna elements which is mounted on the extensions comprises at least one antenna element adapted to transmit the signals. Alternatively, the portion of the antenna elements which is mounted on the extensions comprises at least one antenna element adapted to receive the signals. At least one of the antenna elements may be mounted at a location on the extensions which is a maximum distance from the carrier portion.

According to one modification, the extensions are sized and articulated such that when they are folded, the footprint of the device is substantially the same size as the footprint of the carrier portion. The total area of the footprints of the extensions may substantially equal the area of the footprint of the carrier portion.

According to a further modification, the carrier portion and the extensions are substantially square-shaped, each extension being approximately one quarter the area of the carrier portion and articulated by a corner thereof to a corner of the carrier portion.

The extensions may be connected to the carrier portion by telescopically collapsible rods. The extensions may further be detachable from the carrier portion.

According to another embodiment, the device is provided with a cover which is substantially transparent at least to signals of the frequency transmitted by the antenna elements.

According to a further aspect of the present invention, there is provided a through-wall imaging device having circuitry for transmitting, receiving, and processing signals, which may be ultra-wideband signals, adapted to pass through a wall for imaging of an object or objects behind the wall. The device comprises front-end elements, including antenna elements and circuitry adapted for signal generation and acquisition, and back-end elements adapted for signal processing and display. The front-end elements are mounted in a main housing, and at least some of the back-end elements are housed within an auxiliary housing separate from the main housing, at least during use. The circuitry may comprise an antenna array adapted to transmit and receive the signals.

The auxiliary housing may be attachable to the main housing.

During operation of the device by a user, the main housing may be adapted to be held in front of the user and the auxiliary housing is adapted to be carried on the user's body.

The back-end may comprise a display mounted to, or incorporated with, the main housing.

The back-end may comprise at least one of a processing unit, control units, a power source, and external interfaces mounted in the auxiliary housing.

BRIEF DESCRIPTION OF THE DRAWINGS

In order to understand the invention and to see how it may be carried out in practice, embodiments will now be described, by way of non-limiting examples only, with reference to the accompanying drawings, in which:

FIG. 4A is a schematic representation of another embodiment of the device;

FIG. 4B is a schematic representation of the embodiment illustrated in FIG. 4A in a closed position;

FIG. 12 illustrates the device illustrated in FIG. 1A according to another modification.

DETAILED DESCRIPTION OF EXEMPLARY EMBODIMENTS

Figure 1A:
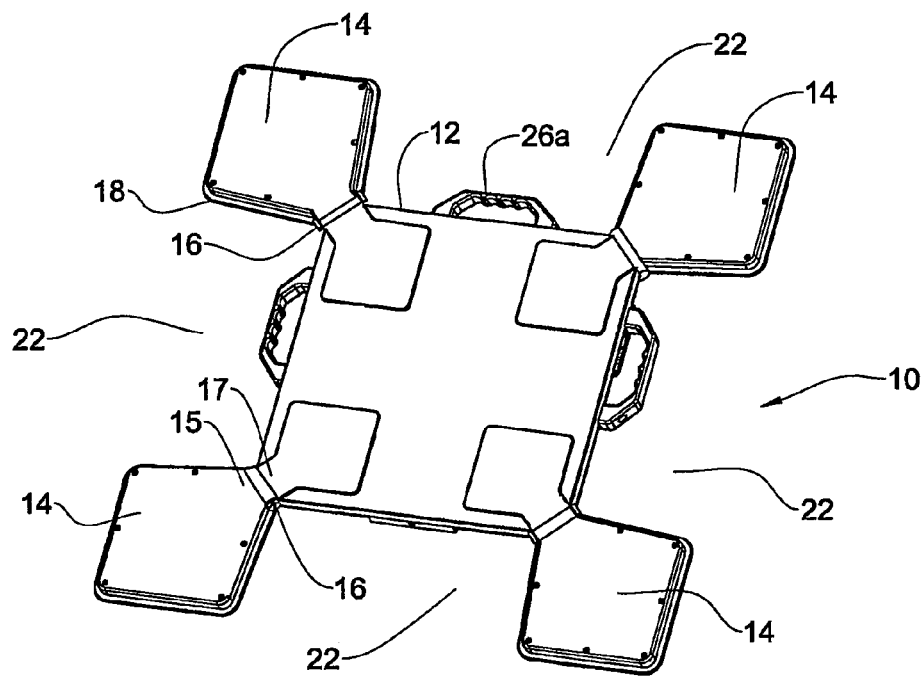
FIG. 1A is a front perspective view of a device according to one embodiment of the present invention in a fully open position.
Figure 1B:
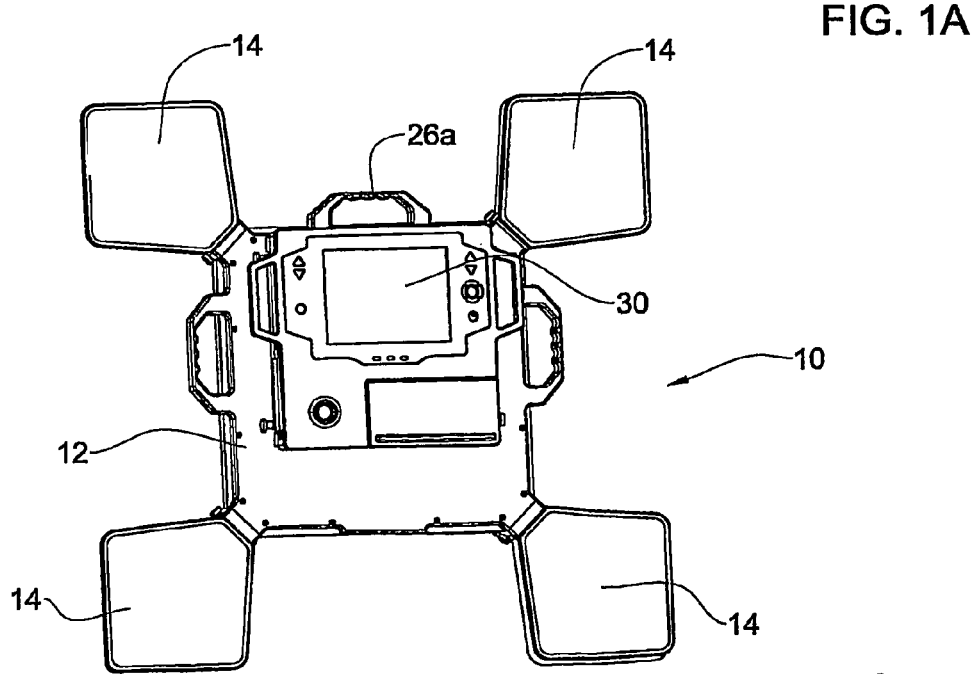
FIG. 1B is a back perspective view of the device illustrated in FIG. 1A in a fully open position.
Figure 1C:
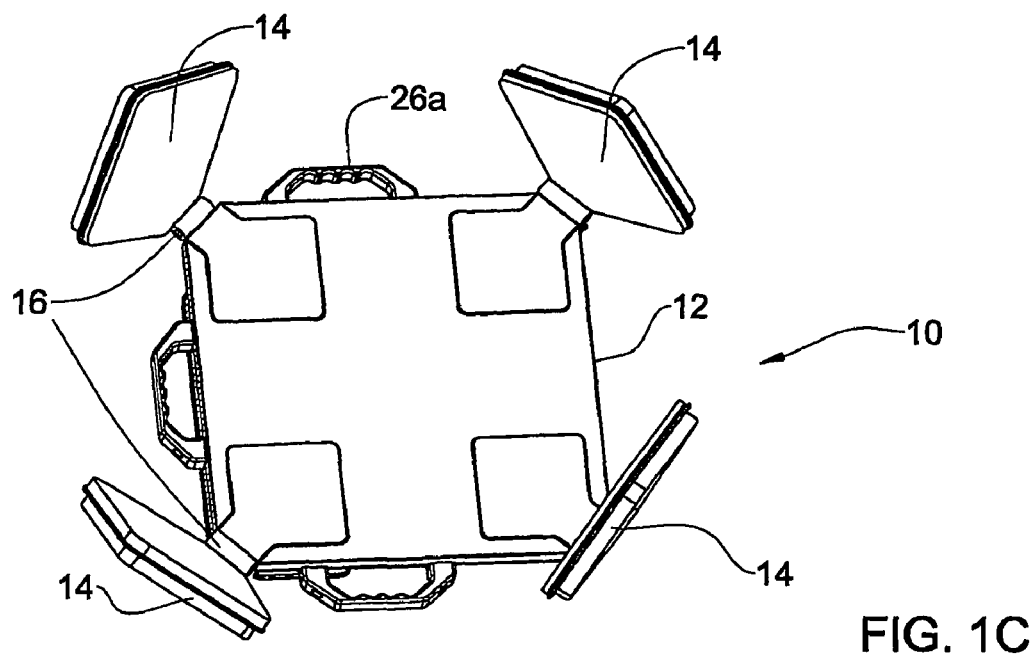
FIG. 1C is a front perspective view of the device illustrated in FIG. 1A during folding.
Figure 1D:
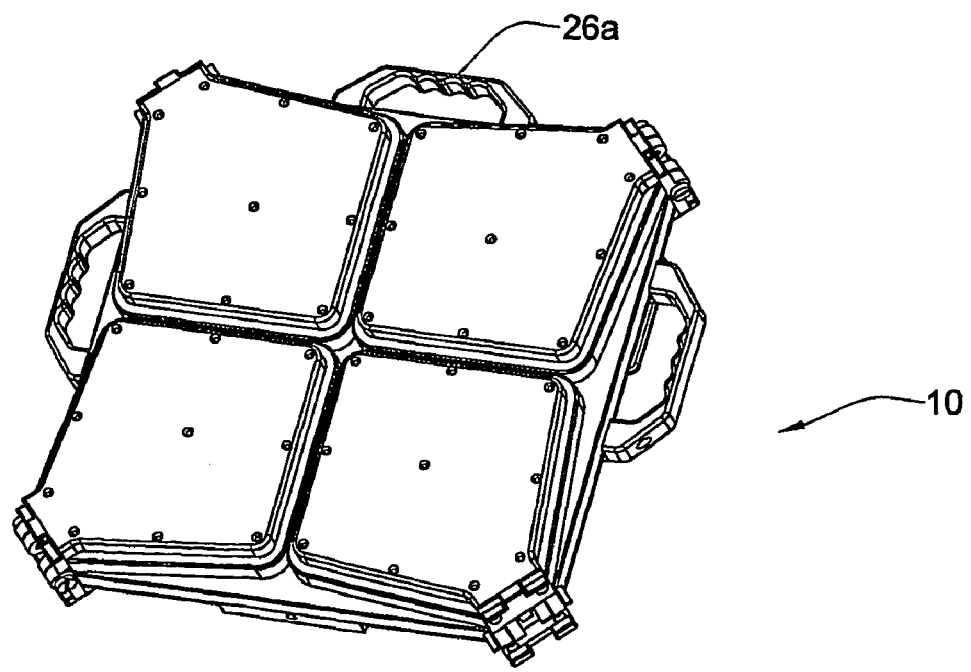
FIG. 1D is a front perspective of the device illustrated in FIG. 1A in a fully closed position.

FIGS. 1A to 1D illustrate a foldable through-wall imaging device, generally indicated at 10, in accordance with one embodiment of the present invention, in its operative, open position (FIGS. 1A and 1B) and inoperative closed position (FIG. 1D). Though not seen in FIG. 1A to 1D, the device comprises signal generation and acquisition elements including antenna elements adapted to transmit 20a (hereinafter "transmitters") and antenna elements adapted to receive 20b (hereinafter "receivers"), constituting an antenna array, for transmitting and receiving ultra-wideband signals adapted to pass through a wall for imaging of objects behind a wall, and signal processing elements, which will later be described in more detail.

As seen in FIGS. 1A to 1D, the device 10 comprises a base and having a carrier portion 12 and extensions 14 spaced apart from each other. As seen, the extensions 14 are designed and arranged so that their total footprint, when folded, is generally coincident with the carrier portion's 12 footprint. Thus, according to the present embodiment, each extension 14 is square-shaped and is approximately one quarter the size of the carrier portion.

Each extension is articulated by a corner 15 thereof to a corner 17 of the carrier portion 12 by hinges 16 to enable folding of the device 10, as shown in FIG. 1C.

Figure 5A:
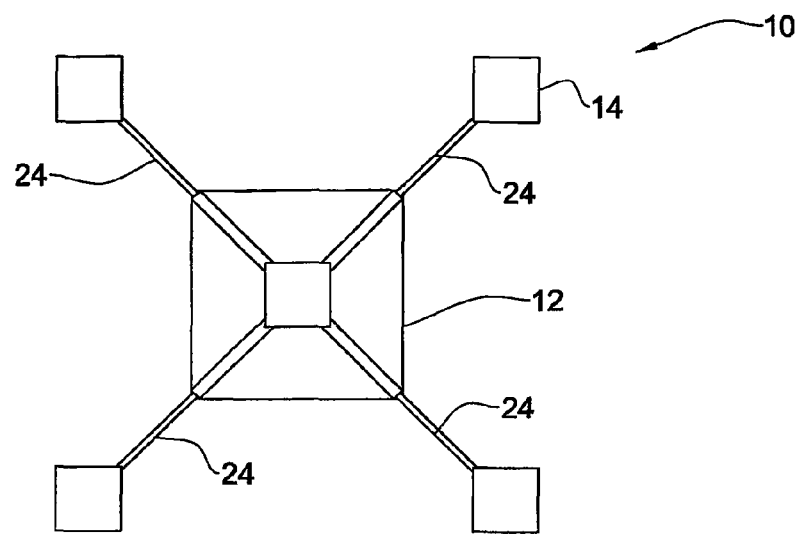
FIGS. 5A through 5C are back views of further embodiments of the device.
Figure 5B:
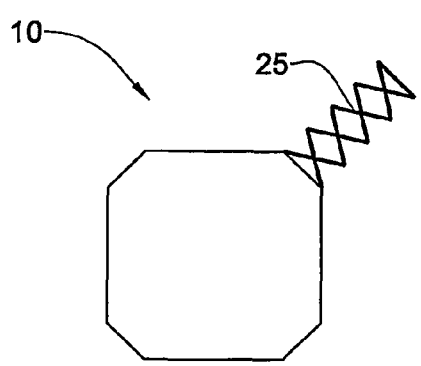
Figure 5C:
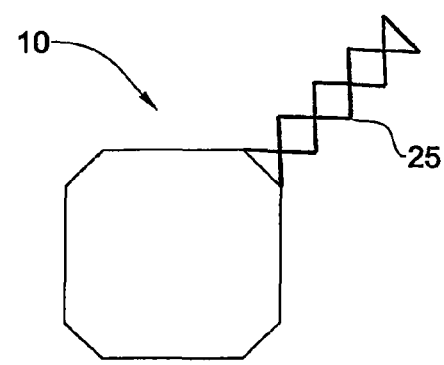

As illustrated in FIG. 5A, the extensions 14 may also be attached to the carrier portion 12 by telescoping rods 24. The rods may be arranged so that when they are collapsed, the extensions 14 are disposed adjacent to the carrier portion 12. This may be accomplished by attaching the rods 24 to the center of the carrier portion, as seen in FIG. 5. Hinges (not shown) may further be provided to further collapse the device once the rods are in their collapsed positions. FIGS. 5B and 5C illustrate, in a closed position and an open position, respectively, a modification of the device 10 wherein the extensions 14 are attached to the carrier portion 12 by the use of an accordion arrangement 25.

The device is adapted to be transported easily by a user when not in use. As such, it may be adapted to be folded, as seen in FIG. 1C, to a fully closed position as shown in FIG. 1D. A carrying handle 26a may be provided to aid in transport.

The signal generation and acquisition elements including the antenna array and, optionally, at least a part of signal processing elements are mounted on the carrier 12 and extensions 14 and covered by a covering 18. The covering, which is a radome, is substantially transparent at least to signals of the frequency transmitted by the antenna elements.

Figures 3A, 3B:
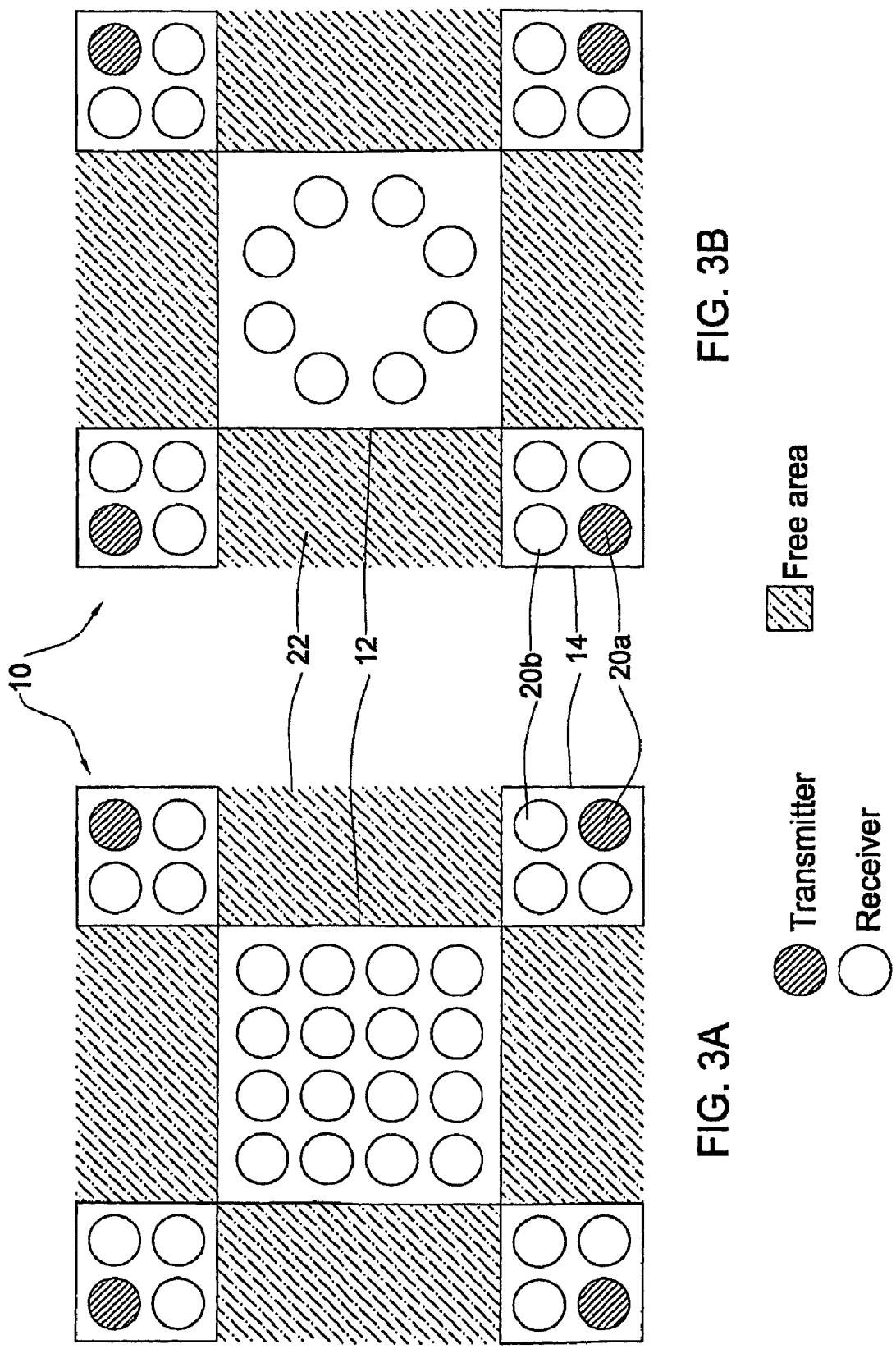
FIGS. 3A and 3B are schematic representations of antenna arrays for use with the device illustrated in FIG. 1A.

Examples of arrangements of the antenna array on the carrier portion 12 and the extensions 14 are illustrated in FIGS. 3A and 3B.

Figure 6A:
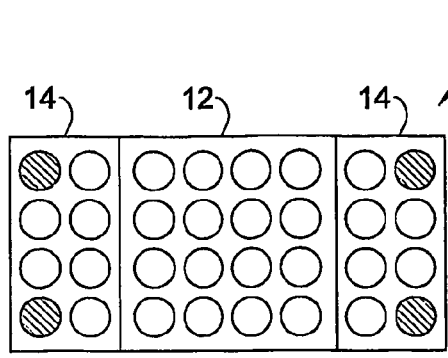
FIGS. 6A through 6E are schematic representations of still further alternative embodiments of the device.
Figure 6B:
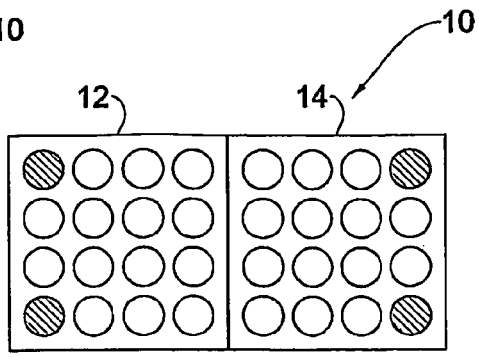
Figure 6C:
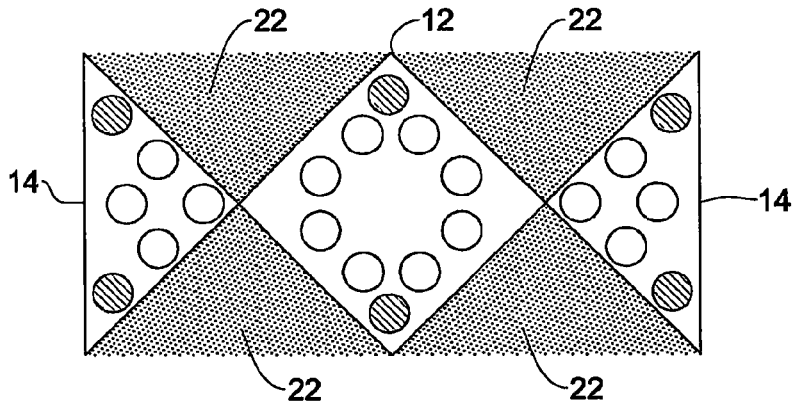
Figure 6D:
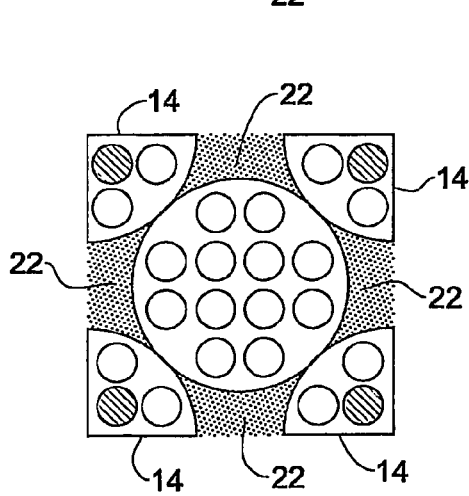
Figure 6E:
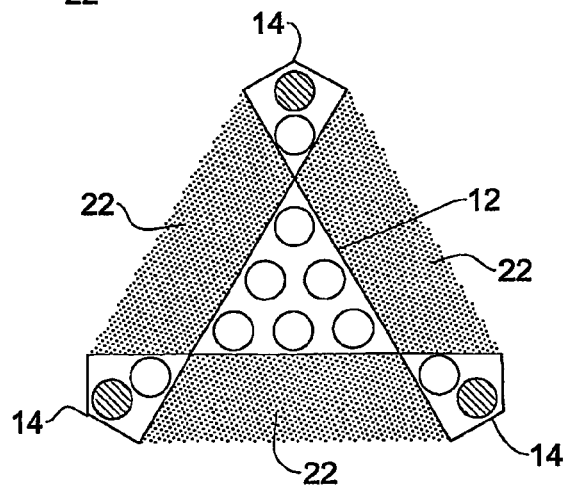

As illustrated in FIGS. 6A through 6E, other arrangements may be used, in consequence with which the geometry of the carrier portion 12 and extensions 14 may be different from that shown in FIGS. 1A and 1B. It will be noted that the arrangements and number of the antenna elements shown is for illustrative purposes only. It will be further noted that it is possible according to the present invention to provide a device 10 as seen in FIGS. 6A and 6B, wherein there are no areas between the extensions which are free of material of the base.

Signal generation and acquisition elements of the device 10 include, in addition to the antenna array, elements responsible for sampling, synchronization, multiplexing, and pre-processing of the acquired signals.

Signal processing elements include a processing unit (or units) adapted for the processing signals received from the signal acquisition elements.

The device 10 further includes control units, which may include switches, buttons, dials, and knobs, a power source, a display unit, and any external interfaces, such as connections to external video displays or to external processors.

Figure 2:
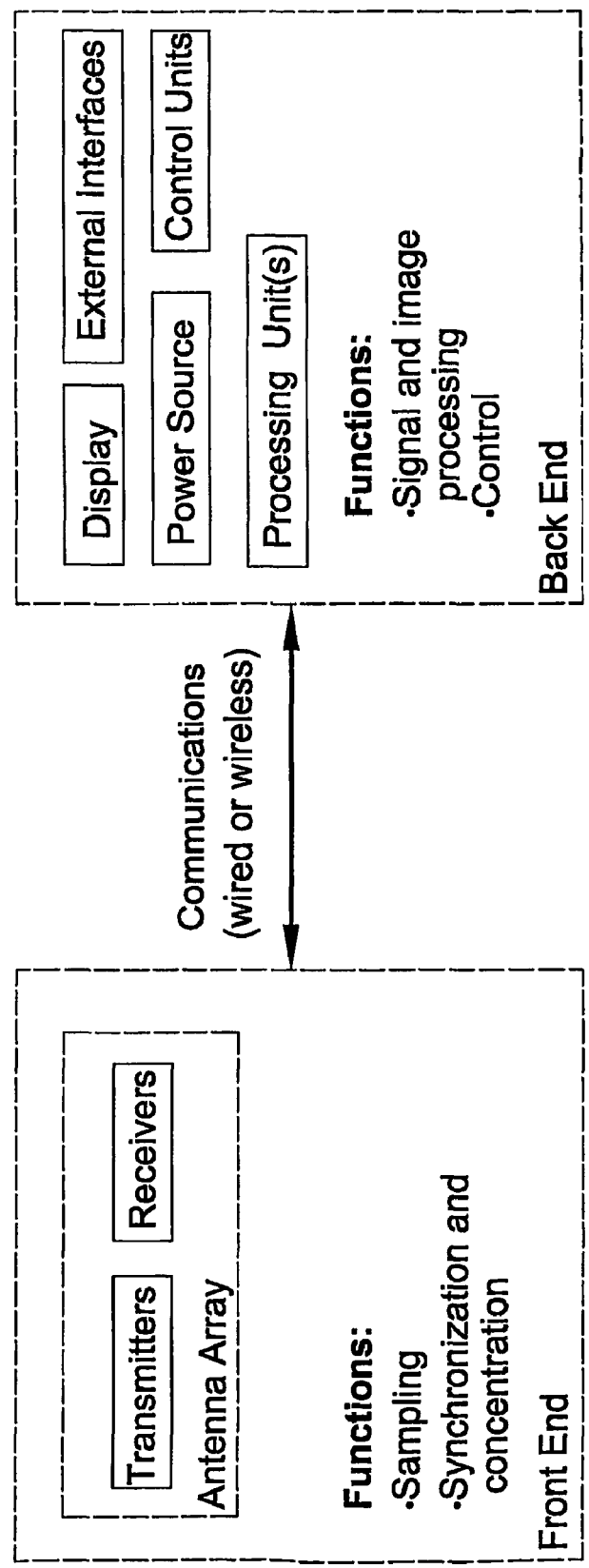
FIG. 2 is a block diagram of the functional elements of the device.

The above elements of the device are functionally divided into elements constituting its front and back ends, as shown in FIG. 2. It should be noted that the terms "front-end" and "back-end" are meant to be understood as a division along functional lines. The elements associated with either end may be physically located in separate portions of the device, and parts of one of the ends may be located proximate to parts of the other end (e.g., the display unit may be located among the antenna array, while the other elements of the back-end are located elsewhere).

The communications means between the front and back-ends may be accomplished via a wired or wireless connection. In addition, power may be transmitted to the front-end from the back-end. This may be via a separate wire, or via the communication line, such as using power over Ethernet or a similar technology.

Reverting to FIGS. 1A and 1B, the carrier 12 carries under the covering 18, part of the antenna array on one side, and a display unit 30 (illustrated in FIG. 1B) on the other. The carrier portion 12 houses therewithin all functional elements of the back-end, and a portion of the functional elements of the front-end. The remainder of the antenna array 11 is housed within the extensions 14. Ribbon wires or any other suitable arrangement may be used to connect the portions of the antenna array carried by the extensions 14 to the portion carried by the carrier portion 12.

As seen in FIGS. 1A, 1B, 3A and 3B, in the fully open position, areas 22 between adjacent extensions may be free of any material of the base. This arrangement contributes toward easy folding as described above, without a significant adverse effect on the imaging resolution of the device when in the fully open position (i.e., when compared to a reference device of the same size wherein the areas are not free of material of the base).

As is well known in the art, it is advantageous that the antenna array be arranged such that the transmitters are disposed as far as possible from each other, and that for each transmitter, there is a receiver disposed as far away therefrom as possible. The aperture of the device is thus increased, which increases the resolution thereof, since an object can be imaged from a wider angular view. Therefore, as illustrated in FIGS. 3A and 3B, the transmitters 20a are located on the extensions 14, in the corners of the device. By providing areas 22 free of material of the base as described above, this increase in resolution is realized with a lighter and smaller device than would be otherwise.

The receivers 20b may be arranged in any desired arrangement, two of which are illustrated schematically in FIGS. 3A and 3B.

A modification of the device described above is shown schematically in FIG. 4A, wherein the extensions 14 are each the same size as the carrier portion 12. The extensions are connected to the carrier portion 12 in such a way so that when the device 10 is folded, the extensions stack upon one another, as illustrated schematically in FIG. 4B.

Figure 7B:
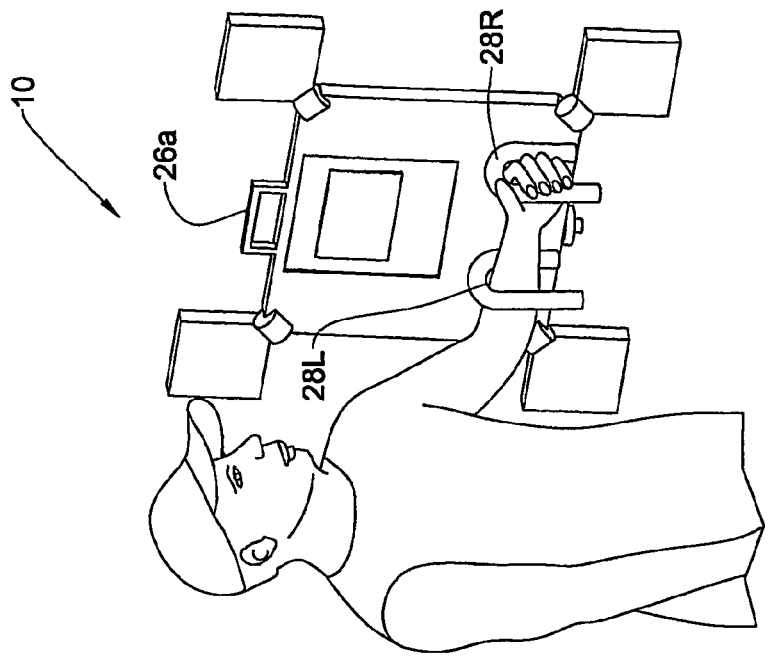
FIGS. 7A and 7B illustrate modifications of the device illustrated in FIG. 1A.
Figure 7A:
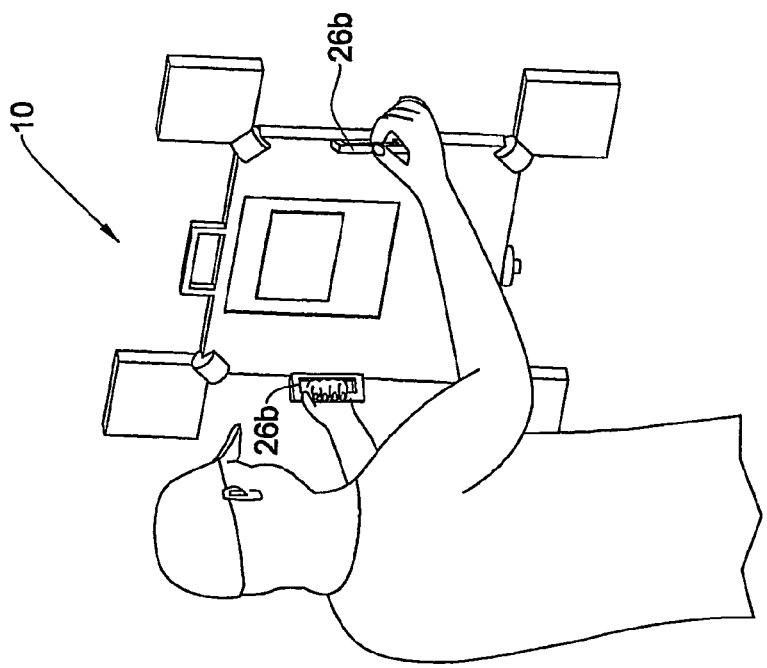

Any one of a number of contrivances may be provided to assist in carrying or supporting the device 10 during use. As shown in FIG. 7A, additional handles 26b may be provided for this purpose. In addition, as illustrated in FIG. 7B, there may be provided two inverted-U-shaped arm brackets 28L and 28R. A user who wishes to carry to device 10 with his left arm, for example, would typically grasp the right bracket 28R with his left hand and allow the left bracket 28L to rest on his left forearm. He may the use his right hand to hold the handle 26a in order to stabilize the device 10 and aid in carrying. A user who wishes to carry the device 10 with his right arm would do the reverse.

Figure 8A:
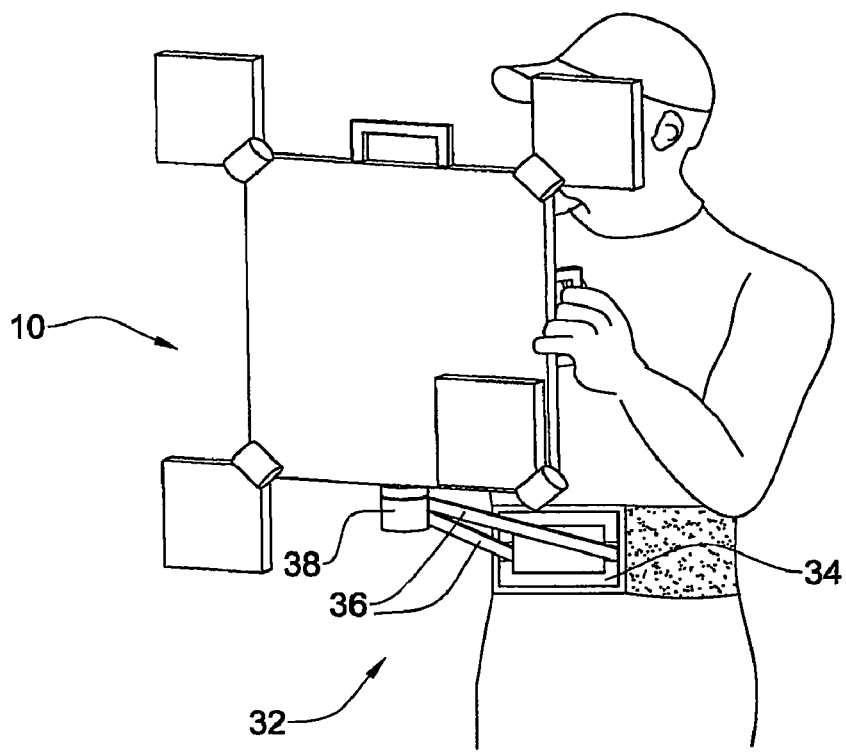
FIG. 8A illustrates the device shown in FIG. 1A in cooperation with a support adapted for use therewith.
Figure 8B:
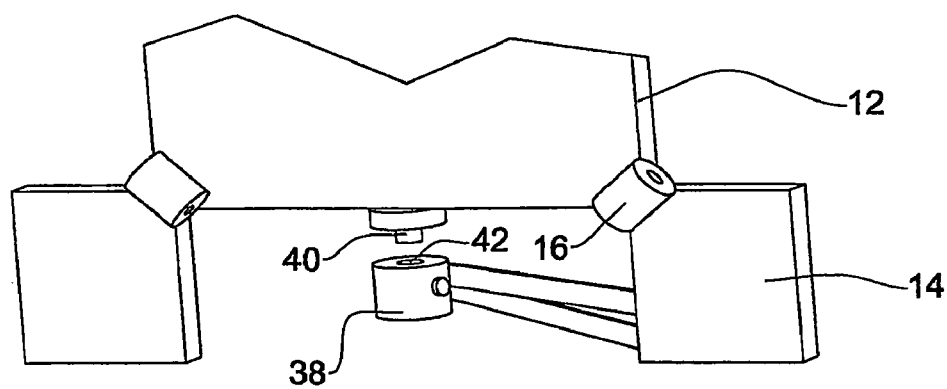
FIG. 8B is a close-up view of a point of connection between the support illustrated in FIG. 6A and the device illustrated in FIG. 1A.

In addition, there may be provided elements directed toward stabilization of the device during use. According to an embodiment illustrated in FIG. 5A, there is further provided a support, generally indicated at 32. (It should be noted the illustration in FIG. 5A of one extension as being folded is only in order to allow an unhindered representation of the support, and should not be construed as a limitation.) The support 32 comprises a belt 34 adapted to be worn by the user, carrying members 36 attached to the belt, and a hub 38. A seen in FIG. 8B, a knob 40 is provided on a lower edge of the carrier portion 12 of the device 10. The knob 40 is adapted to cooperate for insertion into a notch 42 provided in the top of the hub 38.

Figure 9B:
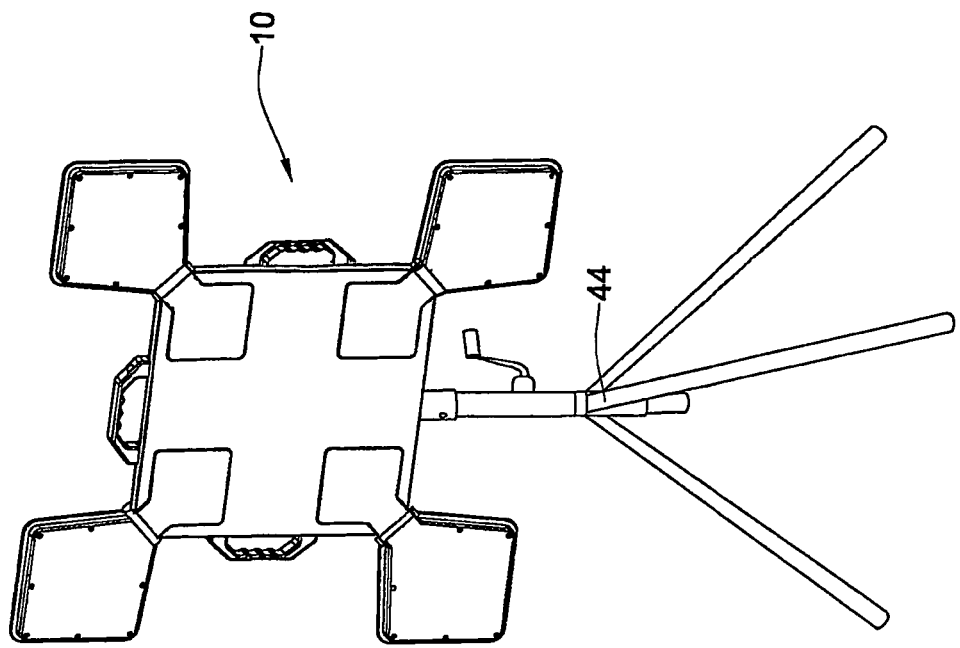
FIGS. 9A and 9B illustrate the device illustrated in FIG. 1A in cooperation with a free-standing supporting structure.
Figure 9A:
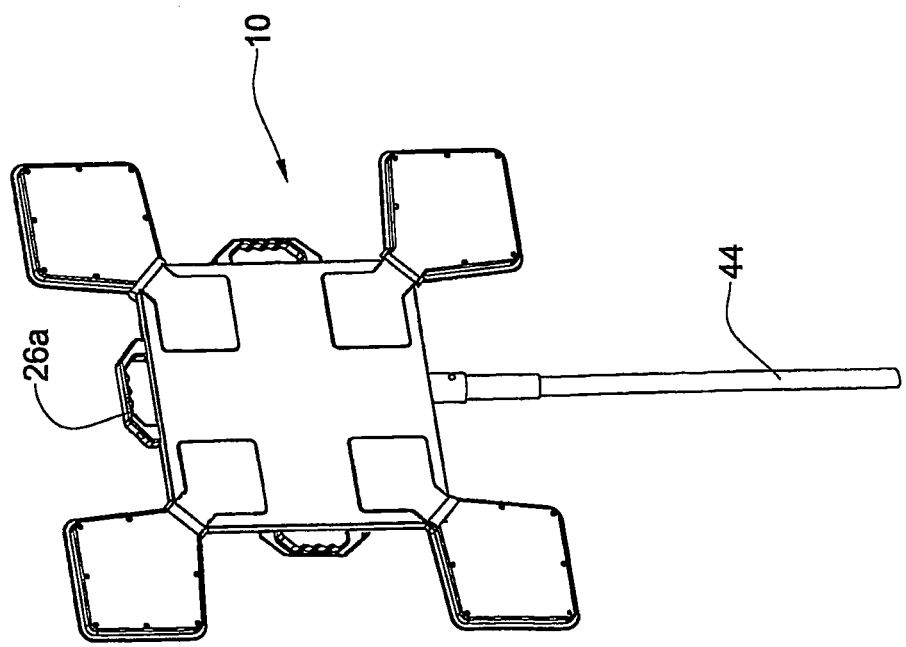

Alternatively, the knob 40 may be mounted on a supporting structure 44, which may be a monopod (as in FIG. 9A), a tripod (as in FIG. 9B), or a bipod (not shown). The monopod and bipod may be used to aid in stabilization of the device 10, with the handle 26a being used to pivotally move the device, while the tripod may be used in stand-alone applications. The supporting structure may also be an unmanned or remote-controlled robot (not shown). The supporting structure may be specially equipped to cooperate with the knob 40 for insertion therein, or the knob 40 may be adapted to cooperate with a standard tripod mount for engagement therewith.

Figures 10, 11:
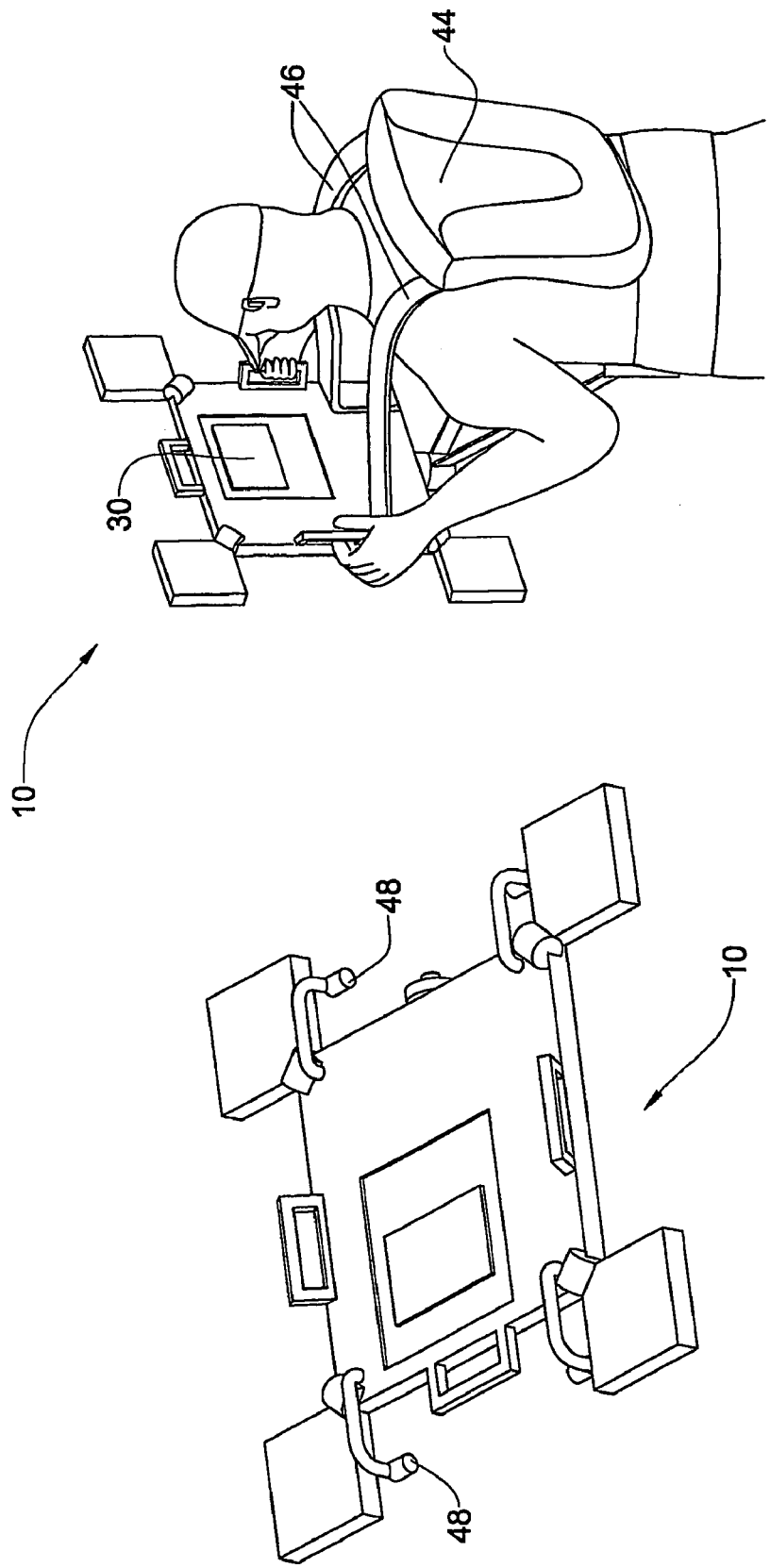
FIG. 10 illustrates a further embodiment of the device illustrated in FIG. 1A.
FIG. 11 illustrates the device illustrated in FIG. 1A according to one modification.

According to another embodiment, as illustrated in FIG. 10, the device 10 may further comprise wheels 48 disposed so as to allow for rolling thereof against a flat surface, with the antenna array facing the surface. This is especially useful when the surface is not vertical, such as when imaging through a roof, a floor (in order to image objects in a room below), or other generally horizontal or angled surface.

According to one modification of any of the above embodiments, functional elements of the back-end are physically divided. One example of a device with such a division is illustrated in FIG. 11. The display unit 30 is still housed in the base 13, which comprises all of the elements of the front-end. However, some or all of the other functional elements of the back-end of the above embodiment are housed within a backpack 44. Shoulder mounts 46, which may be solid or flexible, are provided to carry the backpack, thereby distributing part of the weight of the device 10 to be carried by a user's shoulders. This modification allows for elements of the device which the user does not need direct access to during use to be moved, lightening the base. Other examples of this modification (not shown) besides the knapsack illustrated in FIG. 11 include a standalone briefcase-like unit or using a wireless connection to communicate between the base and portions of the backend which may be housed anywhere, such as a van or a laptop computer. In the event that a wireless connection is used, the base must include its own power source. As seen in FIG. 12, the portion of the device 10 comprising the front end may be mounted on a supporting structure 44 such a tripod, and connected via a cable 50 to a portion of the device which comprises the back-end, which may rest on the ground, thereby reducing the weight which is to be born by the supporting structure.

Those skilled in the art to which this invention pertains will readily appreciate that numerous changes, variations and modifications can be made without departing from the scope of the invention mutatis mutandis.

The invention claimed is:

1. A through-wall imaging device having antenna elements for transmitting and receiving signals configured to pass through a wall for imaging objects behind the wall, the device comprising:
    a base having a carrier portion and a plurality of spaced-apart extensions connected thereto, at least a portion of said antenna elements being mounted on said extensions, the area between adjacent extensions, which is different from said carrier portion, being free of any material of the base at least when said extensions are in an operative state;
    wherein said extensions are movable with respect to the carrier portion between a first position corresponding to a first operative state and a second position corresponding to a second operative state, and
    wherein said extensions are connected to the carrier portion in a manner enabling folding of the extensions onto the carrier portion.

2. A device according to claim 1, wherein said portion of the antenna elements comprises at least one antenna element, selected from a group comprising an antenna element configured to transmit said signals and an antenna elements configured to receive said signals, mounted on at least some of said extensions.

3. A device according to claim 1, wherein said at least one antenna element is configured to transmit said signals and is mounted at a location on said extensions which is a maximum distance from the carrier portion.

4. A device according to claim 1, wherein the extensions are sized and articulated such that when they are folded, the footprint of the device being substantially the same size as the footprint of the carrier portion.

5. A device according to claim 1, wherein the total area of the footprints of the extensions substantially equals the area of the footprint of the carrier portion.

6. A device according to claim 1, wherein the carrier portion and the extensions are substantially square-shaped, each extension being approximately one quarter the area of the carrier portion and articulated by a corner thereof to a corner of the carrier portion.

7. A device according to claim 1, wherein the extensions are connected to the carrier portion using an arrangement selected from the group comprising hinged articulation, telescopically collapsible rods, and accordion arrangements.

8. A device according to claim 1, wherein the extensions are detachable from the carrier portion.

9. A device according to claim 1, further comprising a covering over said antenna elements, said covering being substantially transparent at least to signals of the frequency transmitted by the antenna elements.

10. A device according to claim 1, wherein said signals are ultra-wideband signals.

11. A through-wall imaging device having antenna elements for transmitting and receiving signals configured to pass through a wall for imaging of a objects behind the wall, the device comprising a base having a carrier portion and at least one extension, with a connection thereto, on which at least a portion of said antenna elements is mounted,
wherein the at least one extension is movable with respect to the carrier portion between a first position corresponding to a first operative state and a second position corresponding to a second operative state; and
wherein said at least one extension is connected to the carrier portion in a manner enabling folding of the at least one extension onto the carrier portion.

12. A device according to claim 11, wherein said portion of the antenna elements comprises at least one antenna element, configured to transmit said signals, mounted on at least some of said extensions.

13. A device according to claim 11, wherein said portion of the antenna elements comprises at least one antenna element, configured to receive said signals, mounted on at least some of said extensions.

14. A device according to claim 12, wherein said at least one antenna element is mounted at a location on the extension which is a maximum distance from the carrier portion.

15. A device according to claim 11, wherein the at least one extension is sized and articulated such that when it is folded, the footprint of the device is substantially the same size as the footprint of the carrier portion.

16. A device according to claim 11, comprising a plurality of articulated extensions, wherein the total area of the footprints of the extensions substantially equals the area of the footprint of the carrier portion.

17. A device according to claim 11, wherein said at least one extension is connected to the carrier portion using an arrangement selected from the group comprising hinged articulation, a telescopically collapsible rod, and an accordion arrangement.

18. A device according to claim 11, wherein the at least one extension is detachable from the carrier portion.

19. A device according to claim 11, further comprising a covering over said antenna elements, said covering being substantially transparent at least to signals of the frequency transmitted by the antenna elements.

20. A device according to claim 11, wherein said signals are ultra-wideband signals.

21. A device according to claim 11, wherein said connection is selected from the group comprising wireless communication and physical connection.

* * * * *